United States Patent [19]

Hamilton

[11] Patent Number: 5,450,485
[45] Date of Patent: Sep. 12, 1995

[54] DETECTING WHETHER A TELEPHONE LINE HAS BEEN DISCONNECTED

[75] Inventor: Chris A. Hamilton, Montclair, N.J.

[73] Assignee: Dialogic Corporation, Parsippany, N.J.

[21] Appl. No.: 229,542

[22] Filed: Apr. 19, 1994

Related U.S. Application Data

[63] Continuation-in-part of Ser. No. 27,374, Mar. 8, 1993, abandoned.

[51] Int. Cl.⁶ ............................................. H04M 11/10
[52] U.S. Cl. ..................................... 379/377; 379/386; 379/385; 379/100; 379/216
[58] Field of Search .................. 379/377, 385, 386, 80, 379/82, 216, 97, 100

[56] References Cited

U.S. PATENT DOCUMENTS 4,319,091  3/1982  Meri ........................................ 179/16

Primary Examiner—Jeffery A. Hofsass
Assistant Examiner—Jacques M. Saint-Surin
Attorney, Agent, or Firm—Michael B. Einschlag

[57] ABSTRACT

Apparatus for detecting whether a telephone call has been disconnected, which apparatus includes: (a) a click detector for detecting a click and for generating a "click indication"; (b) a telephone handset impact detector for detecting a telephone handset impact and for generating a "handset impact indication"; (c) a silence detector for detecting silence and for storing a "silent indication"; (d) a timer for determining a predetermined time interval and for transmitting a signal to a controller whenever the time period expires; wherein, in response to the signal, the controller analyzes the "click indication", the handset impact indication", and the "silent indication" to determine whether a predetermined sequence of handset impact, clicks, and silence was detected and, if so, for generating a signal indicating that the telephone call has been disconnected.

8 Claims, 5 Drawing Sheets

DETECTING WHETHER A TELEPHONE LINE HAS BEEN DISCONNECTED

This is a continuation-in-part of Ser. No. 08/027,374 filed Mar. 8, 1993 now abandoned.

TECHNICAL FIELD OF THE INVENTION

The present invention pertains to the field of telephony and, in particular, to method and apparatus for detecting a disconnect event, i.e., whether a telephone call has been disconnected (whether a party on the other end of a line has hung up).

BACKGROUND OF THE INVENTION

In the field of telephony and, in particular, in the field of voice processing telephony, it is often desirable to automatically determine whether a telephone call has been disconnected, i.e., whether a party on the other end of a line has hung up. If a connection was made, for example, through a T-1 digital trunk interface, then each party to the call is notified if the other party has disconnected by changes in well known signaling bits which are periodically transmitted across the telephone network. However, if the call was made through standard analog switches then there is no guarantee that the telephone system will supply any positive signal to indicate that the other party has hung up.

Currently, there are only a few methods which are used to detect disconnection of a call. The first of these methods entails detection of continuous inbound silence since the other party no longer responds. This is not a reliable method since the other party may simply be listening passively, for example, to record messages. Therefore, silence is not a good indication of disconnection. The second of these methods entails detection of inbound dial tone supplied by a central office detector. This is not a reliable method since many central offices fail to supply subscribers any of the signals relied upon for detection. The third and fourth of these methods entail detection of a drop in central office supplied loop current and detection of busy tone, respectively. However, these third and fourth methods suffer from the same disability identified above with respect to the second method.

Thus, there is need in the an for method and apparatus for detecting a disconnect event, i.e., whether a telephone call has been disconnected.

SUMMARY OF THE INVENTION

Embodiments of the present invention advantageously solve the above-identified need in the art by providing method and apparatus for detecting a disconnect event, i.e., whether a telephone call has been disconnected.

In accordance with a first aspect of the present invention, an embodiment comprises: (a) means for detecting a click and for generating a "click indication" indicating whether or not a click was detected; (b) means for detecting a telephone handset impact and for generating a "handset impact indication" indicating whether or not a handset impact was detected; (c) means for detecting silence and for generating a "silent indication" indicating whether or not silence was detected; (d) means for determining a predetermined time interval and for transmitting a signal to a controller means whenever the time period expires; wherein, in response to the signal, the controller means analyzes the "click indication", the "handset impact indication", and the "silent indication" to determine whether a predetermined sequence of handset impact, clicks, and silence was detected and, if so, for generating a signal indicating such detection. For example, one such predetermined sequence comprises: (a) handset impact and/or a click; (b) followed by, zero to several clicks occurring within a first predetermined time period, for example, 250 msec, of the first click or handset impact; (c) followed by silence which lasts less than a second predetermined time period, for example, 1 sec; (d) followed by a click; (e) followed by zero to several clicks occurring within a third predetermined time, for example, 100 msec, of the click from part (d); and (f) followed by silence which lasts at least as long as a fourth predetermined time period, for example, two (2) sec.

In accordance with a second aspect of the present invention, an embodiment comprises: (a) means for detecting a telephone handset impact and (b) means for indicating detection of a telephone call disconnect event in response to detection of a telephone handset impact. A further embodiment of this second aspect of the present invention comprises: (a) means for detecting a telephone handset impact and for generating a "handset impact indication" indicating whether or not a handset impact was detected; (b) means for detecting silence and for generating a "silent indication" indicating whether or not silence was detected; (c) means for determining a predetermined time internal and for transmitting a signal to a controller means whenever the time period expires; wherein, in response to the signal, the controller means analyzes the "handset impact indication" and the "silent indication" to determine whether a predetermined sequence of handset impact and silence was detected, and, if so, for generating a signal indicating that the telephone call has been disconnected. For example, one such predetermined sequence comprises: a handset impact followed by a predetermined length of silence.

BRIEF DESCRIPTION OF THE DRAWING

A complete understanding of the present invention may be gained by considering the following detailed description in conjunction with the accompanying drawing, in which.

DETAILED DESCRIPTION

Embodiments of the present invention advantageously solve the above-identified need in the art by providing method and apparatus for detecting a disconnect event, i.e., whether a telephone call has been disconnected. A telephone signal that is inbound to a voice processing telephone system is comprised of signals produced by many different physical events, for example, signals produced by voice events and signals produced by a disconnect event. The disconnect event can itself be characterized as being comprised of signals produced by a sequence of events, for example, handset noises (referred to sometimes as clunks), clicks, i.e., audio impulses, and noise level transitions. Embodiments of the present invention provide method and apparatus for analyzing sequences of such events and characteristic intervals between portions of the sequences to identify a disconnect event. In particular, FIG. 1, shows, in pictorial form, sequences of events that appear in a telephone signal that are analyzed to determine whether a telephone call has been disconnected.

Figure 1:
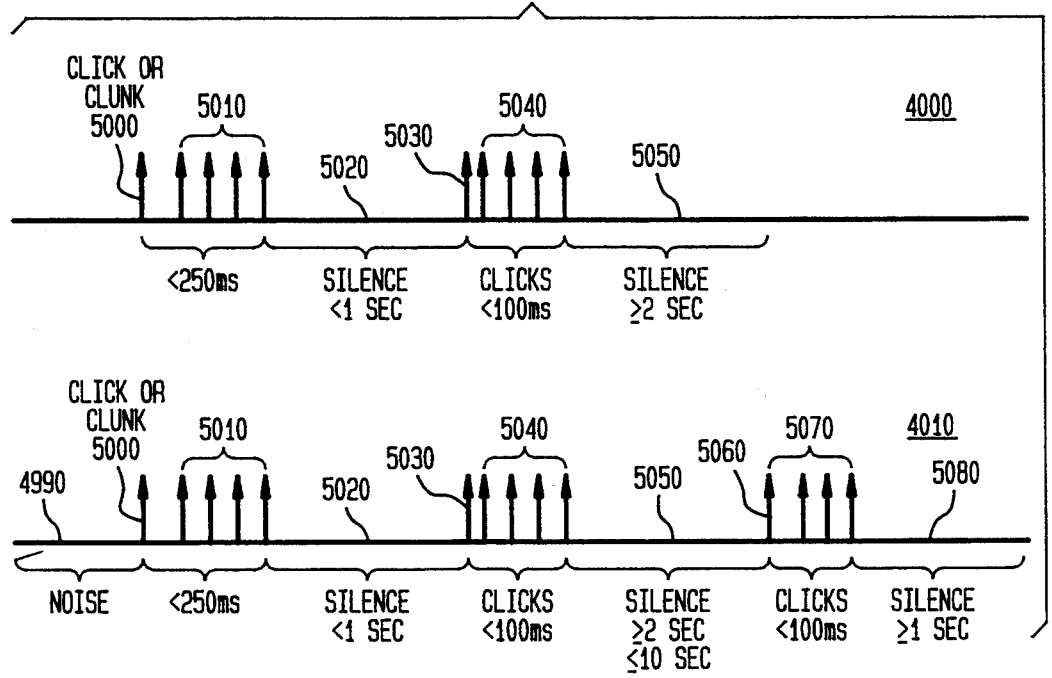
FIG. 1, shows, in pictorial form, sequences of events in a telephone signal that are analyzed to determine whether a telephone call has been disconnected.

In accordance with a first aspect of the present invention, a disconnect event is identified, i.e., reported to, for example, a voice processing telephone system, whenever the following conditions occur, as shown by sequence 4000 in FIG. 1: (a) handset impact and/or a click 5000 is detected; (b) zero to several clicks 5010 are detected within a first predetermined time period of the detection of click 5000, for example, 250 msec; (c) silence 5020 is detected, which silence lasts less than a second predetermined time period, for example, 1 sec; (d) click 5030 is detected; (e) zero to several clicks 5040 are detected within a third predetermined time of the detection of click 5030, for example, 100 msec; and (f) silence 5050 is detected, which silence lasts at least as long as a fourth predetermined time period, for example, two (2) sec.

Figure 2:
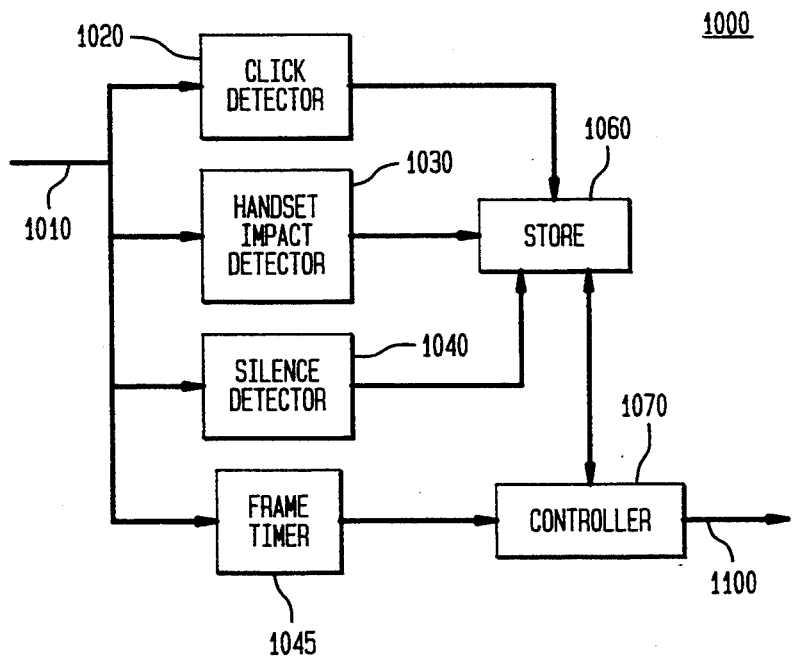
FIG. 2 shows a block diagram of an embodiment of a first aspect of the present invention for detecting whether a telephone call has been disconnected.

FIG. 2 shows a block diagram of an embodiment of the first aspect of the present invention, disconnect detector 1000 (DD 1000). As shown in FIG. 2, telephone signal 1010 is applied as input to click detector 1020, handset impact detector 1030, silence detector 1040, and frame timer 1045.

It is known in the art that audio clicks or impulses are a normal feature of analog signals transmitted over a telephone network. As is known, such clicks arise from a variety of sources such as: (a) opening or closing of a loop current circuit, typically caused by answering or hanging up a telephone, or by dialing pulse digits from a rotary dial telephone and the like and (b) non-specific noise impulses. Click detector 1020 detects whether a click has occurred in a period of time referred to as a frame and stores an indication thereof in storage means 1060. Handset impact detector 1030 detects whether a handset was placed "on-hook" during the frame and stores an indication thereof in storage means 1060. Silence detector 1040 determines whether the frame corresponds to silence. For example, in a preferred embodiment of the present invention, silence detector 1040 examines a measure of total energy for this frame to determine whether the frame corresponds to silence (the measure of total energy is substantially equal to 0 in the preferred embodiment). If there is silence, silence detector stores an indication thereof in storage means 1060. Frame timer 1045 determines whether a time period has occurred which corresponds to a frame and, if so, transmits a signal to controller means 1070.

In response to the signal from frame timer 1045, controller means 1070 obtains the click, handset impact, and silence indications from storage means 1060 to determine whether a disconnect event has occurred. If a disconnect event has occurred, controller means 1070 transmits signal 1100 to a host computer.

In accordance with a second aspect of the present invention, a disconnect event is identified, i.e., reported to, for example, a voice processing telephone system, whenever a telephone handset impact is detected. In a further embodiment of this second aspect of the present invention, a disconnect event is identified whenever a telephone handset impact is detected and it is followed, for example, by a predetermined period of silence. As those of ordinary skill in the art can readily appreciate, the apparatus shown in FIG. 2 can be utilized to provide embodiments of the second aspect of the present invention.

Figure 3:
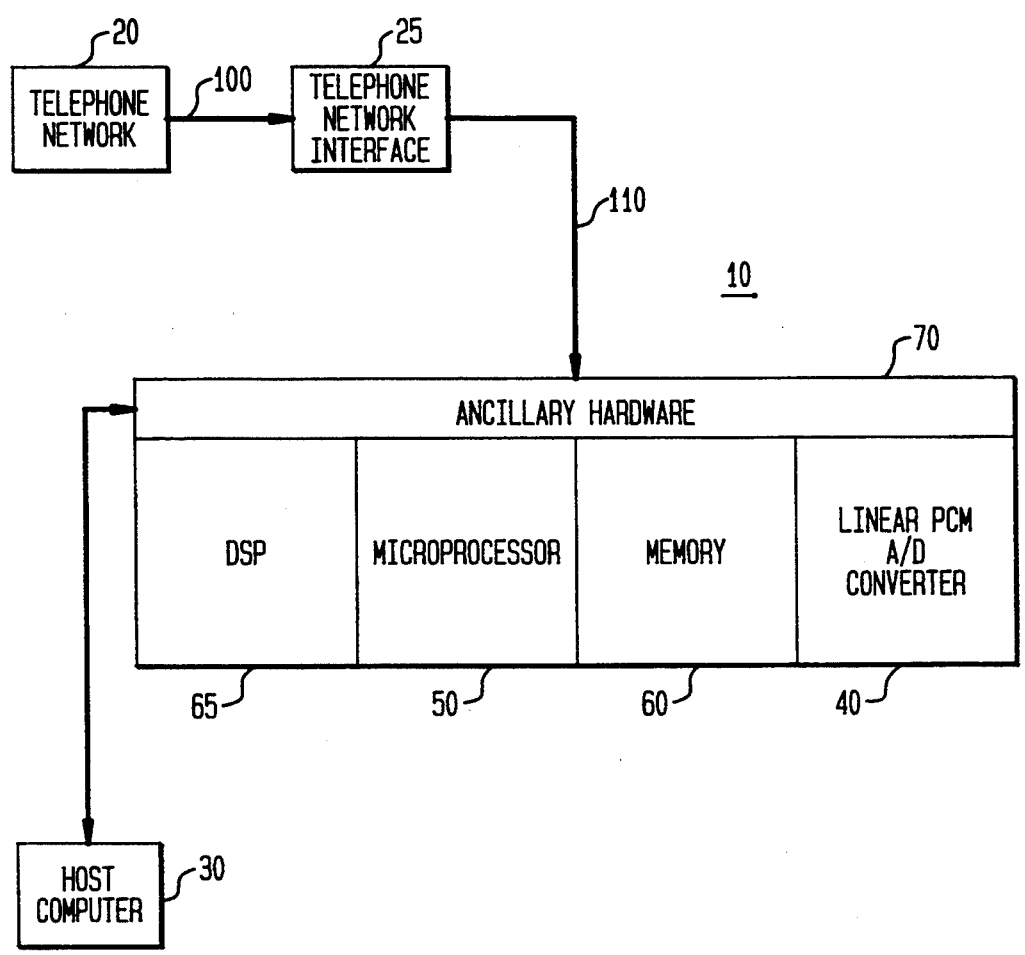
FIG. 3 shows a block diagram of a preferred embodiment of the present invention for detecting whether a telephone call has been disconnected.

FIG. 3 shows a block diagram of a preferred embodiment of inventive apparatus DD 10 for detecting whether a telephone call has been disconnected. As shown in FIG. 3, analog telephone signal 100 from telephone network 20 is transmitted by telephone network interface 25 to DD 10 as signal 110. Many apparatus for use as telephone interface 25 are well known to those of ordinary skill in the art. For example, one such apparatus comprises a portion of a DIALOG/41D Digitized Voice and Telephony Computer Interface circuit which is available from Dialogic Corporation, 300 Littleton Road, Parsippany, N.J. 07054. In pertinent part, this circuit comprises well known means for interfacing with the telephone network to send and receive calls; means, such as transformers, to electrically isolate subsequent circuits; and filter circuits.

Signal 110 which is output from telephone network interface 25 is applied as input to DD 10 and, in particular, to ancillary hardware 70. Specifically, signal 110 is applied to a sample and hold circuit (not shown) in ancillary hardware 70, embodiments of which sample and hold circuit are well known to those of ordinary skill in the art.

The output from the sample and hold circuit contained in ancillary hardware 70 is applied to linear PCM analog-to-digital converter 40. There are many circuits which are well known to those of ordinary skill in the art that can be used to embody linear PCM analog-to-digital converter 40. The encoded signal output from analog-to-digital converter 40 is placed, sample by sample, into a tri-state buffer (not shown) for subsequent transmittal to a data bus (not shown). A tri-state buffer for performing this function is well known to those of ordinary skill in the art. For example, the tri-state buffer may be a TI 74LS244 tri-state buffer which is available from Texas Instruments of Dallas, Tex., or any other such equipment.

DD 10 further comprises microprocessor 50, memory 60, digital signal processor (DSP) 65, and, optionally, a portion of ancillary hardware 70 for use in interfacing with a host computer 30. DSP 65 may be any one of a number of digital signal processors which are well known to those of ordinary skill in the art such as, for example, a Motorola 56000 processor and microprocessor 50 may be any one of a number of microprocessors which are well known to those of ordinary skill in the art such as an INTEL 80286 microprocessor which is available from INTEL of Santa Clara, Calif., or any other such equipment. Memory 60 may be any one of a number of memory equipments which are well known to those of ordinary skill in the art such as an HITACHI 6264 RAM memory which is available from HITACHI America Ltd. of San Jose, Calif., or any other such equipment. The portion of ancillary hardware 70 which interfaces with host computer 30 may be readily fabricated by those of ordinary skill in the art by using circuits which are also well known to those of ordinary skill in the art. For example, the portion of ancillary hardware 70 which interfaces with host computer 30 may be comprised of TI 74LS245 data bus transceivers, TI 74LS244 address buffers, and TI PAL 16L8 control logic, all of which is available from Texas Instruments of Dallas, Tex., or any other such equipment. Finally, as shown in FIG. 3, DD 10 optionally interfaces with host computer 30, which may be any one of a number of computers which are well known to those of ordinary skill in the art such as, for example, an IBM PC/XT/AT, or any other such equipment.

The encoded digital samples output from linear PCM analog-to-digital encoder 40 are placed in the buffer (not shown) and are output, in turn, therefrom to the data bus (not shown). Then, the digital samples are received from the data bus, digital sample by digital sample, by microprocessor 50. Microprocessor 50, in accordance with the present invention, places a predetermined number of digital samples on the data bus for receipt and analysis by DSP 65. Then, as will be described in detail below, microprocessor 50, in conjunction with a program and data stored in memory 60, analyzes the DSP results to detect whether telephone signal 100 is being produced by a disconnect event and, in response thereto, to generate and to transmit a signal to host computer 30. As is well known to those of ordinary skill in the art, host computer 30 may be a pan of an interactive system which is utilized to place telephone calls to members of the public. As such, the interactive system of which host computer 30 is a part utilizes the signal provided by DD 10 to determine whether a member of the public has hung up the telephone and, thereby, to have ended the interaction. Such systems are well known in the art and, for simplicity, their detailed operation need not be set forth here.

If input telephone signal 100 is not an analog signal, as is the case for the embodiment shown in FIG. 3, but is instead a digital signal, embodiments of the present invention convert the digital values of the input signal into a linear PCM digital format. For example, if the input digital signal values had been encoded using μ-law or A-law PCM, they are converted into a linear PCM format. This conversion is performed in accordance with methods and apparatus which are well known to those of ordinary skill in the art such as, for example, by using a look-up table stored in memory 60. Nevertheless, in describing the inventive method and apparatus, for ease of understanding, we will refer to the linear PCM digital format samples which are output from analog-to-digital encoder 40 as digital samples.

The digital samples are input into DSP 65 where they are grouped for analysis into short time duration segments of the input signal, which short time duration segments are referred to as frames. In particular, a frame is comprised of a predetermined number of samples of an input analog signal or a predetermined number of values of a input digital signal, all in linear PCM format, i.e., a frame comprises digital samples which occur for a time period of 16 msec. For each frame, DSP 65 produces the frequency spectrum of the first 12 msec of the 16 msec segment and the last 4 msec of the previous 16 msec segment of input signal 100 by performing a Discrete Fourier Transform (DFT). In particular, in preferred embodiments of the present invention, the DFT is a Fast Fourier Transform (FFT) which is performed by DSP 65. Next DSP 65 determines a measure of the energy of the frequency bins in the frequency spectrum. Finally, DSP 65 determines the total of the measures of energy of the frequency spectrum.

In the preferred embodiment of the present invention shown in FIG. 3 for use in analyzing analog signal 100 which is transmitted over the public switched telephone network and which has a 4000 Hz bandwidth, analog signal 100 is sampled, in accordance with the Nyquist criterion, at least 8000 times/sec and the predetermined number of samples or values per frame is chosen to be 128. Further, in the preferred embodiment, in order to increase temporal resolution, a frame of 128 values which is input to DSP 65 for Fourier analysis is comprised as follows. The "present" frame comprises the last 32 samples or values from the previous frame and the next or "new" 96 values which have been obtained from input signal 100. As a result, the "next" frame to be Fourier analyzed by the FFT after the "present" frame comprises the 32 "old" values from the "present" frame and the next 96 values obtained from input signal 100. Then, prior to calculating the FFT, each sample or value $S_n$ (where n=0, ..., 127) is multiplied by a windowing function, the values of which windowing function have been previously stored in memory. Various windowing functions which are suitable for such use are well known to those of ordinary skill in the art and are advantageous in that their use reduces anomalous spectral components due to the finite frame length of 128 samples.

As a result of the above, when DSP 65 of FIG. 3 is embodied in a Motorola 56000 DSP and 128 samples are used to perform a Fast Fourier Transform (FFT), a 128 bin frequency spectrum for the input signal is produced wherein the frequency bins are 62.5 Hz wide. Each frequency bin in the frequency spectrum has a bin index denoted by n. However, because the signal is real, only the first 64 bins are of interest since the last 64 bins are identical to the first 64 bins. The real and imaginary coefficients determined by the FFT for each frequency bin are squared and summed to provide a bin energy e(n) for each frequency bin in the frequency spectrum and, in addition, the energies for each bin are summed to provide the total energy ETOT for the frame. Then, DSP 65 performs silence detection by examining ETOT and determining whether ETOT is substantially equal to 0. Next, DSP 65 performs click detection in accordance with an invention described in a patent application entitled CLICK DETECTION, which patent application has the same inventor as this patent application, which patent application has been assigned to the assignee of this patent application, and which patent application is hereby incorporated herein by reference. As described in the patent application, click detection is performed by analyzing the absolute value of the above-described linearized samples. Next, DSP 65 performs handset impact detection in accordance with the invention described in the patent application emitled CLICK DETECTION identified above. However, in the matter of handset impact detection, one expects a "longer" click and this is detected by increasing a predetermined constant which corresponds to the maximum length of the signal, i.e., clkmax, in the embodimemt according to the invention in the Click Detection patent application. As can be readily appreciated by those of ordinary skill in the art, the amount by which clkmax is increased to provide handset impact detection may be determined by making tests of actual disconnect events. Then, DSP 65 transmits a "silence indication", a "click indication", and a "handset indication" to memory 60 and transmits a signal to microprocessor 50 for analysis of the frame. In response, microprocessor 50 analyzes the results produced by DSP 65 to detect whether a telephone call has been disconnected.

Figure 4A:
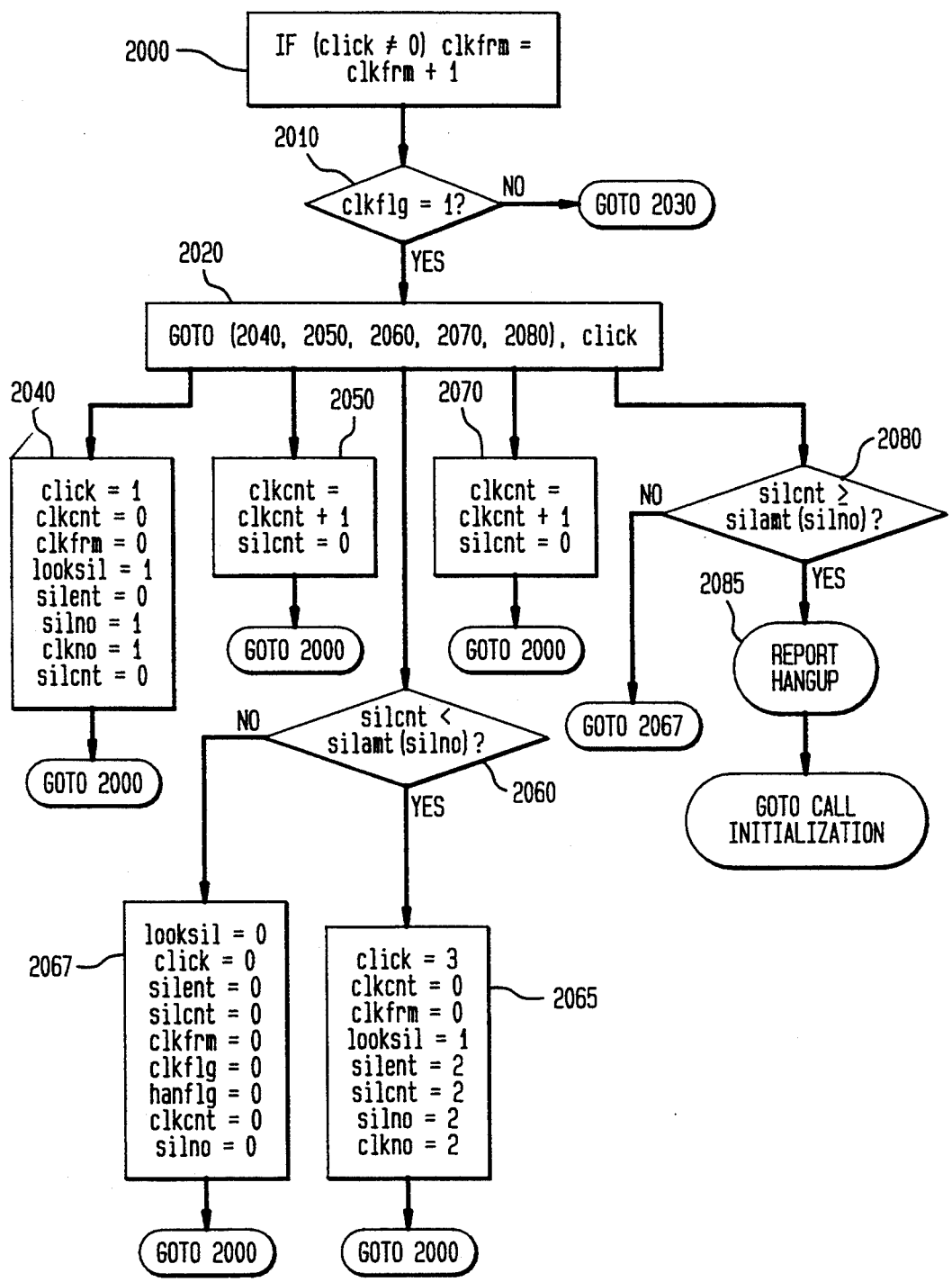
FIG. 4 shows a flow chart of a microprocessor program which forms part of the preferred embodiment of the inventive apparatus shown in FIG. 3.
Figure 4B:
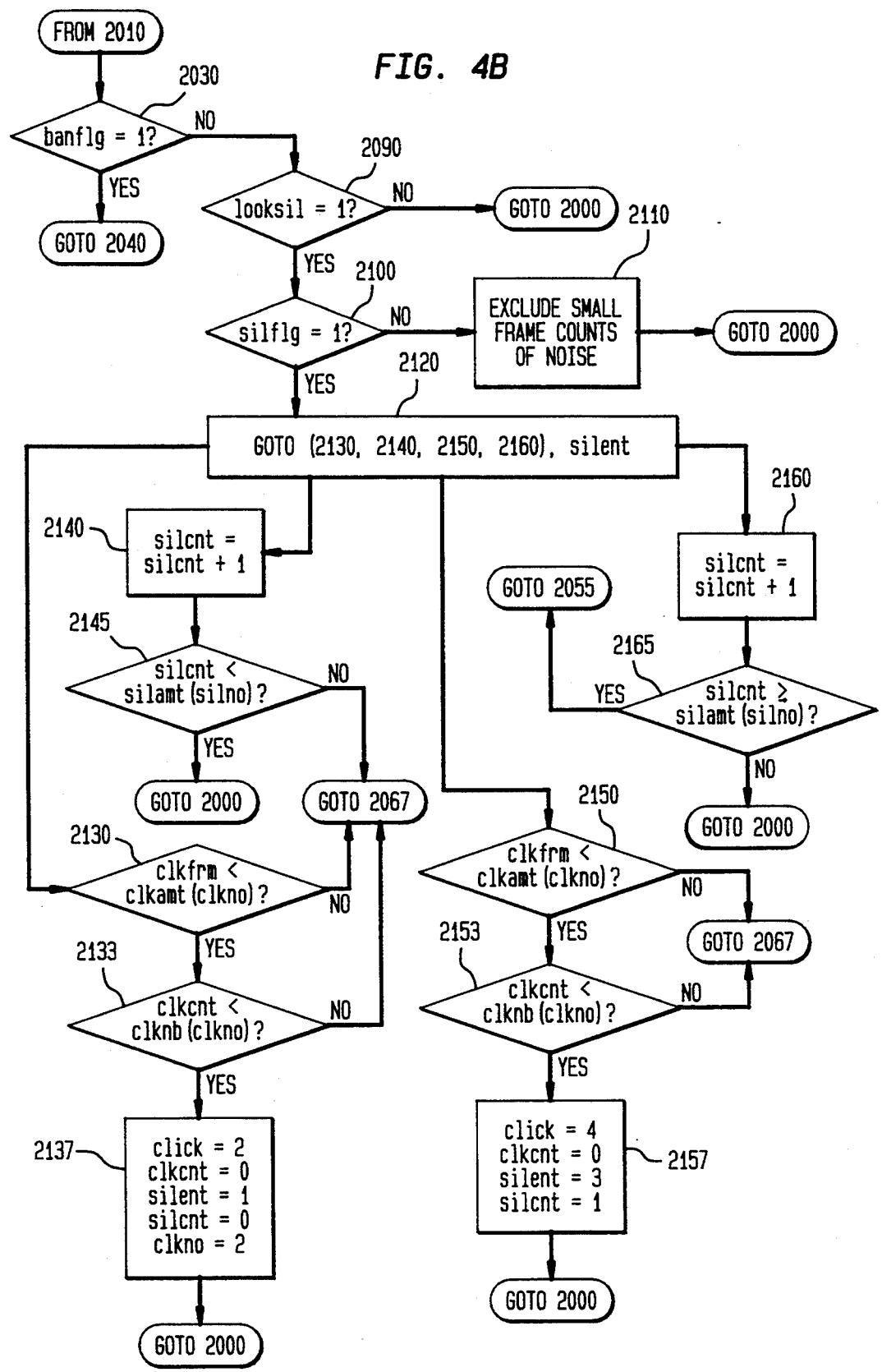

The following further describes the preferred embodiment of the present invention in connection with FIG. 4. When DD 10 is activated for the first time, certain constams are given defined values which are not changed during the operation of microprocessor 50. In particular, silamt(1)=a frame count equivalent to about 1 second; silamt(2)=a frame count equivalent to about 2 seconds; clkamt(1)=a frame count equivalent to about 250 msec; clkamt(2)=a frame count equivalent to about 100 msec; clknb(1)=7; and clknb(2)=7. At the beginning of each telephone call, an initialization routine initializes the following flags and variables:

| | |
|---|---|
| looksil = 0 | means that we are not waiting for silence, = 1 means that we are waiting for silence |
| clkflg = 0 | means this frame had no click detection, = 1 means that this frame had a click detection |
| hanflg = 0 | means this frame had no handset impact detection, = 1 means that this frame had a handset impact detection |
| silflg = 0 | means this frame had no silence detection, = 1 mean that this frame had a silence detection |
| variables: | clkfrm = 0; clkcnt = 0; silno = 0; silcnt = 0; click = 0; and silent = 0 (click = 0 means that no click or handset impact has been detected and silent = 0 means that no silence has been detected). |

Then, as each frame of information is transferred to the main processing routine whose flow chart is shown in FIG. 4.

At box 2000 of FIG. 4, the program retrieves the frame information; including the "click information" (clkflg), "handset impact information" (hanflg), and "silence information" (silflg). Then, the program determines whether variable click is not equal to 0. If so, the program increments frame counter clkfrm by 1. Then, control is transferred to box 2010 of FIG. 4.

At box 2010 of FIG. 4, the program determines whether a click was detected in this frame, i.e., whether clkflg=1. If so, a click was detected and control is transferred to box 2020, otherwise, control is transferred to box 2030.

At box 2020 of FIG. 4, the program branches depending on the value of variable click. If click=0, control is transferred to box 2040; if click=1, control is transferred to box 2050; if click=2, control is transferred to box 2060; if click=3, control is transferred to box 2070; and if click=4, control is transferred to 2080.

At box 2030 of FIG. 4, the program determines whether a handset impact was detected in this frame, i.e. , whether hanflg=1. If so, a handset impact was detected and control is transferred to box 2040 to treat this event as if this were the first click detected, otherwise, control is transferred to box 2090.

At box 2040 of FIG. 4, the first click in the analysis or a handset impact has been detected. The program sets the variable click=1 and sets silent=0 and looksil=1, the latter to indicate that the program is searching for the first period of silence following the first series of clicks. Then, the program sets: (a) variable clkcnt=0 (clkcnt keeps track of the number of clicks in a series); (b) variable clkfrm=0 (clkfrm keeps track of the time period of a sequence of clicks); (c) variable silcnt=0- (silcnt keeps track of the time period of a period of silence); (d) variable silno=1 to indicate that the program will look for the first time period of silence (silno is an index into a list of parameters related to a particular period of silence); and (e) variable clkno=1 to indicate that the program will look for the first sequence of clicks (clkno is an index into a list of parameters related to a particular sequence of clicks). Then, control is transferred back to box 2000 of FIG. 4 to await the next frame.

At box 2050 of FIG. 4, the program has found a further click in the first sequence of clicks and increments variable clkcnt which keeps track of the number of clicks in a sequence of clicks by 1 and resets variable silcnt which keeps track of the time period of silence to 0. Then, control is transferred back to box 2000 of FIG. 4 to await the next frame.

At box 2060 of FIG. 4, the program has found the first click in the second sequence of clicks after the first period of silence and determines whether the length of the first period of silence is less than a predetermined amount, i.e., whether silcnt<silamt(silno). If so, control is transferred to box 2065 of FIG. 4, otherwise, control is transferred to box 2067 of FIG. 4.

At box 2065 of FIG. 4, the length of the first time period of silence following the first sequence of clicks is less than the predetermined amount and the program sets: (a) variable click=3 to start looking for the second sequence of clicks and (b) variable silent=2 and flag looksil=1 to start looking for the second time period of silence. Then, the program sets: (a) variable clkcnt=0; (b) variable clkfrm=0; (c) variable silent=0; (d) variable silno=2 to indicate that the program will look for the second time period of silence; and (e) variable clkno=2 to indicate that the program will look for the second sequence of clicks. Then, control is transferred back to box 2000 of FIG. 4 to await the next frame.

At box 2067 of FIG. 4, the program has determined that the first time period of silence is too long and the program resets the flags and variables, i.e., looksil=0; clkflg= 0; hanfig=0; silflg=0; click=0; silent=0; clkfrm=0; clkcnt=0; silno=0; and silcnt=0. Then, control is transferred back to box 2000 of FIG. 4 to await the next frame.

At box 2070 of FIG. 4, the program has found a further click in the second sequence of clicks and increments variable clkcnt which keeps track of the number of clicks in a sequence of clicks by 1 and resets variable silcnt which keeps track of the time period of silence to 0. Then, control is transferred back to box 2000 of FIG. 4 to await the next frame.

At box 2080 of FIG. 4, the program has found a click after the second period of silence and determines whether the length of the second period of silence exceeds a predetermined amount, i.e., whether silcnt ≧silamt(silno). If so, control is transferred to box 2085. Otherwise, control is transferred to box 2067 since the second time period of silence is too short and the program resets the flags and variables.

At box 2085 of FIG. 4, the program causes DD 10 to generate a signal which is transmitted to host computer 30 identifying the fact that a telephone call disconnection event was detected. Then, control is transferred to the initialization routine to await the next telephone call.

At box 2090 of FIG. 4, the program determines whether one is expecting a period of silence. If so, control is transferred to box 2100 of FIG. 4, otherwise, control is transferred back to box 2000 of FIG. 4 to await the next frame.

At box 2100 of FIG. 4, the program determines whether the frame comprised silence. If so, control is transferred to box 2120 of FIG. 4, otherwise, control is transferred to box 2110 of FIG. 4.

At box 2110 of FIG. 4, the program has some noise during a period of silence. In one embodiment, the program will reset the flags and variables and transfer control back to box 2000 of FIG. 4 to await the next frame. In another embodiment, the program will ignore the noise if a measure of energy of the noise falls below a predetermined threshold amount and control will be transferred back to box 2000 of FIG. 4 to await the next frame. In still another embodiment, the program will count the frames of noise which occur during the period of silence and, if the number is below a predetermined count, the program will transfer control back to box 2000 of FIG. 4 to await the next frame, whereas, if the number is greater than or equal to the predetermined count, the program resets the flags and variables and transfers control back to box 2000 of FIG. 4 to await the next frame.

At box 2120 of FIG. 4, the program branches depending on the value of variable silent. If silent=0, control is transferred to box 2130; if silent=1, control is transferred to box 2140; if silent=2, control is transferred to box 2150; and if silent=3, control is transferred to box 2160.

At box 2130 of FIG. 4, the first frame of silence in the first time period of silence has been detected and the program determines whether the time length of the first series of clicks is less than a predetermined amount, i.e., whether clkfrm<clkamt(clkno). If so, control is transferred to box 2133 of FIG. 4, otherwise, control is transferred to box 2067 of FIG. 4 to reset.

At box 2133 of FIG. 4, the program determines whether the number of clicks detected during the first sequence of clicks is less than a predetermined number, i.e., whether clkcnt<clknb(clkno). If so, control is transferred to box 2137 of FIG. 4, otherwise, control is transferred to box 2067 of FIG. 4 to reset.

At box 2137 of FIG. 4, the program sets click=2, clkcnt=0, silent=1, silcnt =0, and clkno=2. Then, control is transferred back to box 2000 of FIG. 4 to await the next frame.

At box 2140 of FIG. 4, another frame of silence for the first time period of silence has been detected. The program increments the count of the time period of the silence by 1, i.e., silcnt=silcnt+1. Then, control is transferred to box 2145 of FIG. 4.

At box 2145 of FIG. 4, the program determines whether the length of the silence exceeds a predetermined amount, i.e., whether silcnt<silamt(silno). If not, control is transferred to box 2067 of FIG. 4 to reset, otherwise, control is transferred back to box 2000 of FIG. 4 to await the next frame.

At box 2150 of FIG. 4, the first frame of silence in the second time period of silence has been detected and the program determines whether the time length of the second series of clicks is less than a predetermined amount, i.e., whether clkfrm<clkamt(clkno). If not, control is transferred to box 2067 of FIG. 4 to reset, otherwise, control is transferred to box 2153 of FIG. 4.

At box 2153 of FIG. 4, the program determines whether the number of clicks detected during the second sequence of clicks is less than a predetermined number, i.e., whether clkcnt<clknb(clkno). If so, control is transferred to box 2157 of FIG. 4, otherwise, control is transferred to box 2067 of FIG. 4 to reset.

At box 2157 of FIG. 4, the program sets click=4, clkcnt=0, silent=3, and silcnt=1. Then, control is transferred back to box 2000 of FIG. 4 to await the next frame.

At box 2160 of FIG. 4, another frame of silence for the second time period of silence has been detected. The program increments the count of the time period of the silence by 1, i.e., silcnt=silcnt+1. Then, control is transferred to box 2165 of FIG. 4.

At box 2165 of FIG. 4, the program determines whether the length of the silence exceeds a predetermined amount, i.e., whether silcnt≧silamt(silno). If so, control is transferred to box 2085 of FIG. 4 to generate a signal identifying the disconnect event, otherwise, control is transferred back to box 2000 of FIG. 4 to await the next frame.

As those of ordinary skill in the an will readily appreciate, the program shown in FIG. 4 can readily be modified to provide embodiments of the second aspect of the present invention.

In an embodiment of a third aspect of the present invention, a disconnect event is identified, whenever the following conditions occur, as shown by sequence 4010 in FIG. 1: (a) line noise 4990 is detected prior to detection of handset impact or click 5000 and a measure of the line noise energy is stored; (b) handset impact and/or a click 5000 is detected; (c) zero to several clicks 5010 are detected within a first predetermined time period of the detection of click 5000, for example, 250 msec; (d) silence 5020 is detected, which silence lasts less than a second predetermined time period, for example, 1 sec; (e) click 5030 is detected; (f) zero to several clicks 5040 are detected within a third predetermined time of the detection of click 5030, for example, 100 msec; (g) silence 5050 is detected, which silence lasts at least as long as a fourth predetermined time period, for example, two (2) sec and last no more than a fifth predetermined time period, for example, 10 sec; (h) click 5060 is detected, which click 5060 is related, for example, to a trunk's being dropped by a local central office; (i) zero to several clicks 5070 are detected a sixth predetermined time of the detection of click 5060, for example, 100 msec; (e) silence 5080 is detected, which silence lasts at least as long as a seventh predetermined time period, for example, greater than or equal to 1 sec, and obtaining a measure of the energy during silence 5080; and (j) determining whether a ratio of the line noise energy obtained in step (a) and the measure of energy obtained in step (i) is less than a seventh predetermined amount, which amount may be determined by experiment in a manner which is well known to those of ordinary skill in the art.

Figure 5:
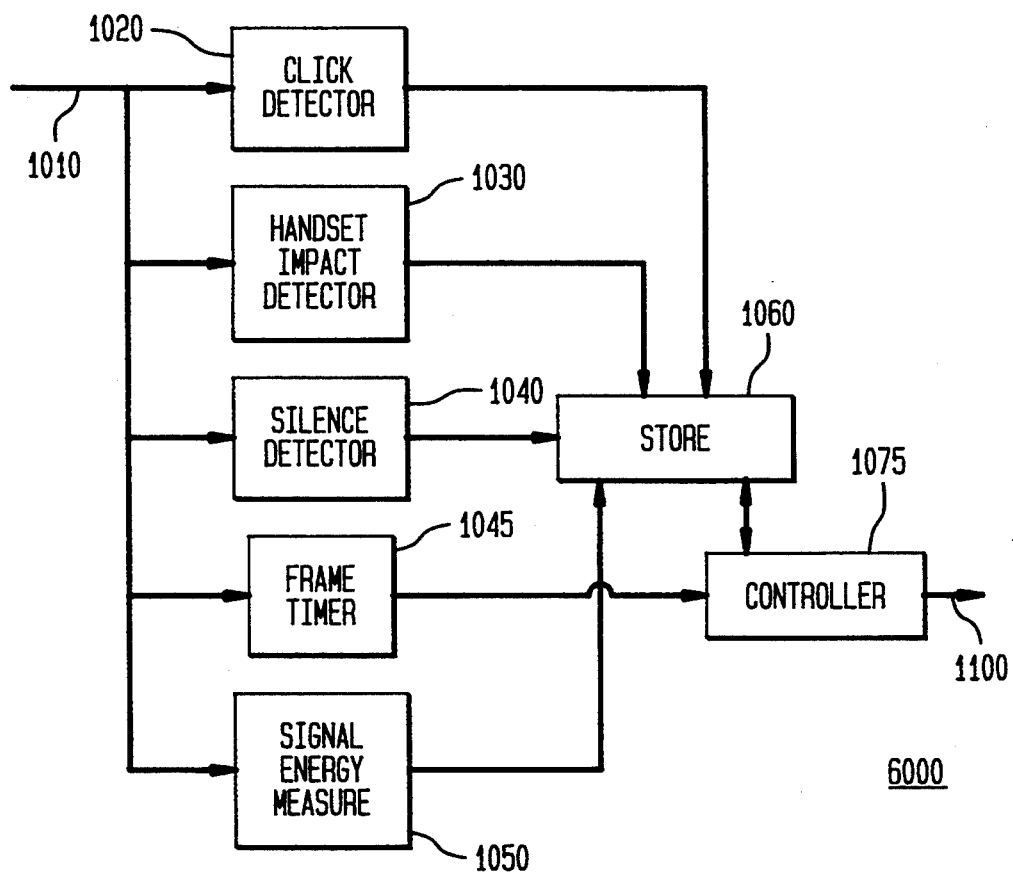
FIG. 5 shows a block diagram of an embodiment of a third aspect of the present invention for detecting whether a telephone call has been disconnected.

FIG. 5 shows a block diagram of the embodiment of the third aspect of the present invention for detecting whether a telephone call has been disconnected discussed just above. Disconnect detector 6000 (DD 6000) shown in FIG. 5 is the same as DD 1000 shown in FIG. 2 except than DD 6000 comprises signal energy measurer 1050 for obtaining a measure of signal energy during a frame and for storing the measure in storage means 1060. In addition, controller 1075 of DD 6000 further comprises means for analyzing the measure of energy stored in storage means 1060 along with the click, handset impact, and silence indications described above to determine whether a disconnect event occurred. In a preferred embodiment of this embodiment of third aspect of the present invention, controller 1075 detects line noise 4990 whenever the measure of energy is greater than a predetermined amount of energy associated with silence and below a predetermined amount of energy associated, for example, with voice. Then, the measure of line noise energy which occurs prior to click or the handset impact 5000 is stored in storage means 1060 for later in the analysis.

The sequence of clicks and silence shown in sequence 4010 shown in FIG. 1 may be analyzed in a manner similar to that shown above in FIG. 4 for analyzing sequence 4000 FIG. 1. The difference being that, in the case of analyzing sequence 4010, one merely has to add steps of program for detecting click 5060, sequence of clicks 5070, and silence 5080. The manner in which such steps are performed ought to be clear to those of ordinary skill in the art in light of the teaching of this specification relating to analysis of a telephone signal to detect sequence 4000.

As those of ordinary skill in the art will readily appreciate, a program used to fabricate the embodiment of the third aspect of the present invention described above may o readily be modified to provide embodiments of the second aspect of the present invention discussed above.

In accordance with still further embodiments of the present invention, whenever, any of the disconnect detectors described above determines that a disconnect event has occurred and has sent a report to a host computer, the host computer will generate a message for transmission back over the line asking, for example, "Are you still there? If so, either speak or press the "*" on your telephone pad." Then, the host computer will wait for a response for a predetermined amount of time. Apparatus for transmitting such a message and for analyzing a response thereto are well known to those of ordinary skill in the art. For example, one such system is readily available where the host computer comprises a voice mail system.

Those skilled in the an recognize that further embodiments of the present invention may be made without departing from its teachings. For example, in accordance with the present invention, the energy in the frequency bins in the frequency spectrum of a frame of the signal, e(n), may be determined in many different ways. In particular, in another embodiment of the present invention, e(n) equals the sum of the absolute value of the real part of the component of frequency bin n and the absolute value of the imaginary part of the component of frequency bin n. In addition, the above embodiment may be alternatively implemented utilizing specific hardware apparatus in place of the microprocessor and program embodiment described above.

In addition, embodiments of the present invention are not restricted to apparatus shown in FIG. 2 and 5 and described above wherein indications of detection events, for example, clicks, clunks, silence, and so forth, are stored in a common store. It is within the spirit of the present invention that such indications may be transmitted directly to the controller from the detection apparatus themselves, or in response, for example, to queries from the controller or, in response, for example, to a signal obtained directly from a frame timer.

What is claimed is:

1. Apparatus for detecting whether a telephone call has been disconnected, which apparatus comprises:
    click detector means for detecting a click and for generating a click indication indicating whether or not a click was detected;
    handset impact detector means for detecting a telephone handset impact and for generating a handset impact indication indicating whether or not a handset impact was detected;
    silence detector means for detecting silence and for generating a silent indication indicating whether or not silence was detected;
    means for determining a predetermined time interval and for transmitting a signal to a controller means whenever the time period expires;
    wherein the controller means comprises analysis means, responsive to the signal and to click indications, handset impact indications, and silence indications, for, determining whether a predetermined sequence of handset impact, clicks, and silence was detected and, if so, for generating a signal indicating that the telephone call has been disconnected.

2. The apparatus of claim 1 wherein the analysis means comprises means for determining whether the click indications, the handset impact indications, and the silent indications indicate that the following predetermined sequence was detected: a first lead click or a handset impact, followed by zero or a first predetermined number of clicks which occur within a first predetermined amount of time of the first lead click or handset impact, followed by silence which lasts less than a second predetermined amount of time, followed by a second lead click, followed by zero or a second predetermined number of clicks which occur within a third predetermined amount of time of the second lead click, followed by silence which lasts at least as long as a fourth predetermined amount of time.

3. The apparatus of claim 2 wherein the first predetermined amount of time is about 250 milliseconds, the second predetermined amount of time is about 1 second, the third predetermined amount of time is about 100 milliseconds, and the fourth predetermined amount of time is about 2 seconds.

4. Apparatus for detecting whether a telephone call has been disconnected, which apparatus comprises:
    click detector means for detecting a click and for generating a click indication indicating whether or not a click was detected;
    handset impact detector means for detecting a telephone handset impact and for generating a handset impact indication indicating whether or not a handset impact was detected;
    silence detector means for detecting silence and for generating a silent indication indicating whether or not silence was detected;
    means for determining a predetermined time interval and for transmitting a signal to a controller means whenever the time period expires;
    energy detector means for obtaining a measure of the energy of the signal during the predetermined time interval;
    wherein the controller means comprises analysis means, responsive to the signal and to click indications, handset impact indications, silence indications, and measures of energy, for determining whether a predetermined sequence of handset impact, clicks, and silence was detected and whether a ratio of a measure of energy obtained prior to the predetermined sequence and a measure of energy obtained during the last silence of the predetermined sequence is below a predetermined constant and, if so, for generating a signal indicating that the telephone call has been disconnected.

5. Apparatus for detecting whether a telephone call has been disconnected, which apparatus comprises:

handset impact detector means for detecting a telephone handset impact and for generating a handset impact indication indicating whether or not a handset impact was detected;

silence detector means for detecting silence and for generating a silent indication indicating whether or not silence was detected;

means for determining a predetermined time interval and for transmitting a signal to a controller means whenever the time period expires;

wherein the controller means comprises analysis means, responsive to the signal and to handset impact indications and silence indications, for determining whether a predetermined sequence of handset impact and silence was detected and, if so, for generating a signal indicating that the telephone call has been disconnected.

6. Apparatus for detecting whether a telephone call has been disconnected, which apparatus comprises:

means for detecting a telephone handset impact and for generating a handset impact indication; and;

means, in response to the handset impact indication, for generating a signal indicating that the telephone call has been disconnected.

7. Method for detecting whether a telephone call has been disconnected, which method comprises the steps of:

detecting a click and generating a click indication;

detecting a telephone handset impact and generating a handset impact indication;

detecting silence and generating a silent indication;

determining the expiration of a predetermined time interval; and in response to the expiration and click indications, handset impact indications; and silent indications, determining whether a predetermined sequence of handset impact, clicks, and silence was detected and, if so, generating a signal indicating that the telephone call has been disconnected.

8. Method for detecting whether a telephone call has been disconnected, which method comprises the steps of:

detecting a telephone handset impact and generating a handset impact indication;

detecting silence and generating a silent indication;

in response to handset impact indications and silent indications, determining whether a predetermined sequence of handset impact and silence was detected and, if so, generating a signal indicating that the telephone call has been disconnected.

* * * * *